United States Patent
Capuzzello et al.

(10) Patent No.: US 7,949,346 B2
(45) Date of Patent: May 24, 2011

(54) METHOD AND SYSTEM FOR LOCATING A TERMINAL IN A WIRELESS TELECOMMUNICATIONS NETWORK, COMPUTER PROGRAM PRODUCT THEREFOR

(75) Inventors: Alessandro Capuzzello, Turin (IT); Davide Filizola, Turin (IT); Massimo Colonna, Turin (IT)

(73) Assignee: Telecom Italia S.p.A., Milan (IT)

( * ) Notice: Subject to any disclaimer, the term of this patent is extended or adjusted under 35 U.S.C. 154(b) by 429 days.

(21) Appl. No.: 10/582,967

(22) PCT Filed: Dec. 23, 2003

(86) PCT No.: PCT/IB03/06146
§ 371 (c)(1),
(2), (4) Date: Jun. 15, 2006

(87) PCT Pub. No.: WO2005/071894
PCT Pub. Date: Aug. 4, 2005

(65) Prior Publication Data
US 2007/0010257 A1  Jan. 11, 2007

(51) Int. Cl.
*H04W 24/00* (2009.01)
(52) U.S. Cl. .................... 455/456.1; 455/456.6
(58) Field of Classification Search ............... 455/456.1, 455/456.6
See application file for complete search history.

(56) References Cited

U.S. PATENT DOCUMENTS

| | | | |
|---|---|---|---|
| 6,269,246 B1 | 7/2001 | Rao et al. | |
| 6,522,888 B1 * | 2/2003 | Garceran et al. | 455/456.3 |
| 2002/0019698 A1 | 2/2002 | Vilppula et al. | |
| 2003/0043073 A1 | 3/2003 | Gray et al. | |
| 2003/0125046 A1 * | 7/2003 | Riley et al. | 455/456 |
| 2004/0156372 A1 * | 8/2004 | Hussa | 370/401 |
| 2007/0135134 A1 * | 6/2007 | Patrick | 455/456.1 |

FOREIGN PATENT DOCUMENTS

| | | |
|---|---|---|
| EP | 1 111 951 A2 | 6/2001 |
| EP | 1 180 873 A2 | 2/2002 |
| WO | WO 01/41468 A2 | 6/2001 |
| WO | WO 02/054813 A1 | 7/2002 |
| WO | WO 03/049479 A1 | 6/2003 |

\* cited by examiner

*Primary Examiner* — Jinsong Hu
*Assistant Examiner* — Omoniyi A Obayanju
(74) *Attorney, Agent, or Firm* — Finnegan, Henderson, Farabow, Garrett & Dunner, L.L.P.

(57) ABSTRACT

A method is disclosed for locating a terminal in a local wireless telecommunications network adapted to provide an estimated position of the terminal depending on a set of configuration data and a set of measuring data indicating whether the terminal belongs to a subset of said coverage areas and acquired from the terminal or network. The set of configuration data has a plurality of data bases of configurations, each one having a respective weight function, and the set of measuring data has a plurality of measuring types, depending on the type of terminal. A method for associating, to every combination of a data base of configurations and a measuring type, a respective locating procedure corresponding to an accuracy value of the locating estimation and actuating the locating procedure related to a combination selected by executing a related processing program. A processing system and a processing program or group of programs can be executed by the system and arranged to perform the above method.

17 Claims, 3 Drawing Sheets

Fig.1

| Info conf. / Terminal Meas. | AP pos. | AP pos. + Network | AP pos. + Network + Environment | Signatures | AP pos + Signatures | AP pos. + Network + Signatures | AP pos. + Network + Environment + Signatures |
|---|---|---|---|---|---|---|---|
| Server AP | Proc. 1 | Proc. 5 | Proc. 9 | Proc. 13 | Proc. 17 | Proc. 21 | proc. 25 |
| Server AP + Received AP | Proc. 2 | Proc. 6 | Proc. 10 | Proc. 14 | Proc. 18 | Proc. 22 | Proc. 26 |
| Server AP + par. Server Ap | Proc. 3 | Proc. 7 | proc. 11 | Proc. 15 | Proc. 19 | Proc. 23 | Proc. 27 |
| Server AP + par. Server AP + Received AP + par. Received AP | Proc. 4 | Proc. 8 | Proc. 12 | Proc. 16 | Proc. 20 | Proc. 24 | proc. 28 |

METHOD AND SYSTEM FOR LOCATING A TERMINAL IN A WIRELESS TELECOMMUNICATIONS NETWORK, COMPUTER PROGRAM PRODUCT THEREFOR

CROSS REFERENCE TO RELATED APPLICATION

This application is a national phase application based on PCT/IB2003/006146, filed Dec. 23, 2003, the content of which is incorporated herein by reference.

FIELD OF THE INVENTION

The present invention deals with a method and a system for locating a terminal in a local telecommunications network of the wireless type, in addition to a wireless telecommunications network comprising such system, and a corresponding computer program product.

The local wireless telecommunications networks are meant, depending on what is included, for example, in IEEE 802.11 Standard and commonly known, as networks optimized by geographic areas with limited sizes, such as individual palaces for offices, warehouses or set of buildings and owned used and managed, in general, by a single organization.

The term local wireless telecommunications networks also covers networks for airports, harbors, railway stations and whichever is similar to such type of environment.

The term local wireless telecommunications networks also covers networks for very limited areas as regards sizes, such as, for example, small offices, individual laboratories and home environments.

In the following description, the term local wireless telecommunications networks will cover such type of definition.

A local wireless telecommunication networks, such as, for example a WLAN, is composed of a plurality of base stations (Access Points) for user access to the network, distributed on a circumscribed area. All Access Points have omnidirectional or directional antennas through which they realize a cellular coverage of the area itself. The Access Points are then generally connected to a wired network (wired LAN) through which the users can use several services.

Every user is equipped with a terminal, for example a portable or palmtop computer, for using the services. Such terminals are equipped with a wireless communication apparatus (WLAN apparatus) integrated in the terminal or not, such as for example a PCMCIA card, a PCI adapter, etc. Communications between Access Points and terminal WLAN apparata exploit the radio medium and occur through standard protocols, such as for example the IEEE 802.11 or HIPERLAN protocol, or proprietary ones.

PRIOR ART

Many systems and methods for locating WLAN terminals are known in the art. In particular, there are systems and methods that allow performing the WLAN terminals location in a network that is entirely composed of common apparata (Access Points and WLAN apparata), namely systems and methods that do not require modifications to network apparata and/or terminals in order to introduce accessory functionalities required by the location process.

The methods (and systems) known in literature are essentially of two types:
Methods (and systems) that Required the a Priori Knowledge of Measured Signatures.

Signatures are maps that associate to predetermined spatial positions belonging to the network coverage area one or more parameters measured by the signal transmitted by the Access Points.

An example of measured signature can be obtained by arranging, for example, measuring instruments in points whose position is known a priori and collecting for each one of them, for example, the received powers related to signals transmitted by various Access Points and/or received signal/noise ratio values and/or simply recording the serving Access Point and/or the received Access Points.

A method for locating a WLAN terminal based on signatures collection is disclosed in WO-A-02-054813. Such method allows performing an estimation of the position of a WLAN terminal without the need of knowing a priori both the network infrastructure and the characteristics of the environment in which the network itself is deployed. The location process is divided into two steps: system calibration step, in which signatures are collected, and a step in which terminal location is performed.

During calibration, for each one of the points in the affected area (calibration points) a set of data (signatures) is determined, that comprise the point position and the measured value in such point of one or more parameters (for example power or error rate) of the received signal, for each one of the available channels in the system. Signatures are used to realize a statistic model of the parameter or the set of parameters with respect to the position.

The second step is the terminal location real and proper, that occurs after that this one has performed a measure of the same parameters for each one of the channels, depending on the comparison between the results of such measures and the statistic model.

Methods of this type can be very accurate. However, they require a setup (configuration) step that consists in a rather big collection of signatures. In fact, it is necessary to perform a measure of the chosen parameters, further specifying for each point, its geographic coordinates, in the area within which the location service has to be made available.

In an indoor environment, it can be problematic and costly to locate the coordinates for signatures collection points; moreover, this configuration step must be performed again when any network modification is carried out (insertion, removal or movement of an Access Point, modification of a frequency or of one of its radio-electric parameters, etc.) or in the environment (furniture movements, etc.).

Finally, these methods, in order to be able to fully exploit their potentiality, require that, when locating, the terminal whose position must be located is able to carry out a measure of signal parameters transmitted by the Access Points. There are several cases in which the terminal equipped with WLAN terminal is not able to perform such measures.

Methods (and Systems) that Require the Knowledge a Priori of the Access Point Positions.

Within such class, the methods (and systems) are divided by type of information required by the system during the location process, and namely:

a. methods and systems that perform a terminal location depending on the Access Point to which the terminal itself is connected (serving Access Point);
b. methods and systems that perform a terminal location depending on the powers of signals received from a terminal and transmitted from the Access Points that is sees.

An example of a system in which the location is performed only depending on the Access Point to which the terminal is connected is disclosed in EP-A-1 180 873. This document discloses, in particular, a system for distributing information services to users of a WLAN, arranged to provide specific information about a terminal position by identifying the Access Point from which the user performs his own service requests and relating the position of such Access Point in the network infrastructure with the position of a site belonging to the network coverage area whose characteristics are object of the request.

An example of a system in which instead the location is performed depending on measures carried out by the terminal of parameters related to received Access Points is disclosed in EP-A-1 111 951.

In such document it is provided that a terminal performs power (RSS, Radio Signal Strength) measures and/or BER (Bit Error Rate) measures on the signal received by it and transmitted by at least three (preferably more) Access Points, and that it sends such measures to a server which, having a map available with the position of the network infrastructure Access Points, estimates the WLAN terminal position through a triangulation mechanism.

This method assumes that all Access Points transmit with the same power, have omnidirectional antennas and that the interference level is homogeneous on the whole area; these assumptions often are not verified since in a WLAN network of a common type the Access Points can transmit at different powers and the used antennas can be directional and not omnidirectional.

Methods of this type have the disadvantage to be able to locate a terminal with an error of the same magnitude error and size of the cells. In many applications and services, this uncertainty makes the system unusable, both because often the cells are too big, and because the application or service requires a higher accuracy than the one that can be obtained with the examined method.

The Applicant has detected that, within the known methods and systems, no location tools are provided that can be flexibly adapted to the characteristics of used terminals and the type of installed local network.

SUMMARY OF THE INVENTION

Object of the present invention is realizing a method and a system for locating terminals of a local wireless telecommunications network that do not depend on a pre-established set of configuration data, but that allow a relatively accurate location of a terminal by flexibly adapting themselves to those information that the system has available, namely the set of configuration data, the terminal characteristics and the desired location accuracy.

According to the present invention such object is obtained due to a method and a system for locating a terminal in a local wireless telecommunications network having the characteristics contained in the independent Claims.

Further objects of the invention are a local wireless telecommunications network and a processing program or group of programs as claimed.

Synthetically, the present invention is based on the principle of selecting one of a plurality of location procedures or techniques of a terminal in a local wireless telecommunications network depending on information which the locating system has or can have available (namely the set of system configuration data, information or measures that the terminal or network can provide and the desired location accuracy).

According to one among the various characteristics of the present invention, the locating request of a terminal operates flexibly; in fact, to satisfy the necessary requirements for the locating request, a predefined and rigid system configuration is not necessary, nor the type of mobile terminal to be used is a constraint.

Depending on available configuration information or configuration economy criteria, and the type of terminal to which the location has to be provided, the method and system object of the invention allow choosing the best combination of information to obtain the best possible accuracy or satisfy a minimum desired accuracy threshold, respectively.

The method has the following characteristics:
- it can be used to locate any terminal (in terms of combination of terminal, wireless communication apparatus and operating system), independently from the measures that the terminal itself is able to provide;
- in a starting configuration step, depending on the location accuracy required by the users and depending on used terminals, it specifies to the system user which information (in terms of Access Points position, their electromagnetic characteristics, signatures etc.) it is necessary to provide;
- if the system user has available only a subsystem of such information, the system is anyway able to guarantee the location service with the maximum possible degree of accuracy.

The present invention provides, among others, a flexible solution for locating WLAN terminals that is adapted to any combination of information being present or available in the affected WLAN.

Procedures are further provided for locating WLAN terminals under particular combinations of available configuration information and measures by the terminal that represent valid compromises in terms of location accuracy and configuration complexity.

DETAILED DESCRIPTION OF THE FIGURES

Further advantages and characteristics of the present invention will appear from the following detailed description, provided as a non-limiting example with reference to the enclosed drawings, in which.

DETAILED DESCRIPTION OF THE INVENTION

The method and system for locating terminals in a wireless telecommunications network described herein below specifically refer to a network of the WLAN type, as recalled in the introductory part of this description.

The invention, however, is applied to any wireless network of the local type.

For realising the invention, necessary information for locating a terminal are divided into two categories: respectively, information that are necessary to provide to the locating system in a configuration step and information (or measures) that a WLAN terminal or the network itself must provide to the system every time locating a terminal is required.

Information in the first category, that can be used individually or in combination, are:

- location of Access Points, namely coordinates, with respect to a known reference, of the points in which Access Points or their antennas are arranged in case they are not integrated in the apparatus, but connected thereto through a transmission line;
- radio-electric network characteristics, such as for example powers radiated by different Access Points, antenna radiation diagrams, the directions of maximum radiation of the antenna, cables attenuations in case of external antennas, used frequencies, etc.;
- environmental characteristics, both in terms of arrangement of (perimetral and internal) walls, doors, windows, etc. and in terms of their electromagnetic characteristics, such as attenuation coefficients, reflection, etc.;
- signatures, namely the map of values of received power or other measured radio-electric or performance parameters of the signal transmitted by Access Points, in predetermined spatial positions belonging to the network coverage area.

It is to be noted that the collection of signatures requires an initial measuring operation that can also be very cumbersome. Signatures must be collected from a terminal, such as a portable PC or a palmtop with WLAN apparatus, suitably realised or equipped with a specific software for collecting such measures and for transferring them to a related data base.

Information (or measures) in the second category, that can be used individually or in combination, are:

- the serving Access Point, namely the Access Point identification to which the WLAN terminal is connected (for example MAC addresses);
- received Access Points, namely Access Point identifications received by the terminal;
- one or more radio-electric (such as, for example, power) or performance (such as, for example, BER or PER (Packet Error Rate)) parameters, measured on the signal received from WLAN terminal and transmitted from the serving Access Point;
- one or more radio-electric or performance parameters measured on all signals received from WLAN terminal and transmitted from received Access Points.

Figure 1:
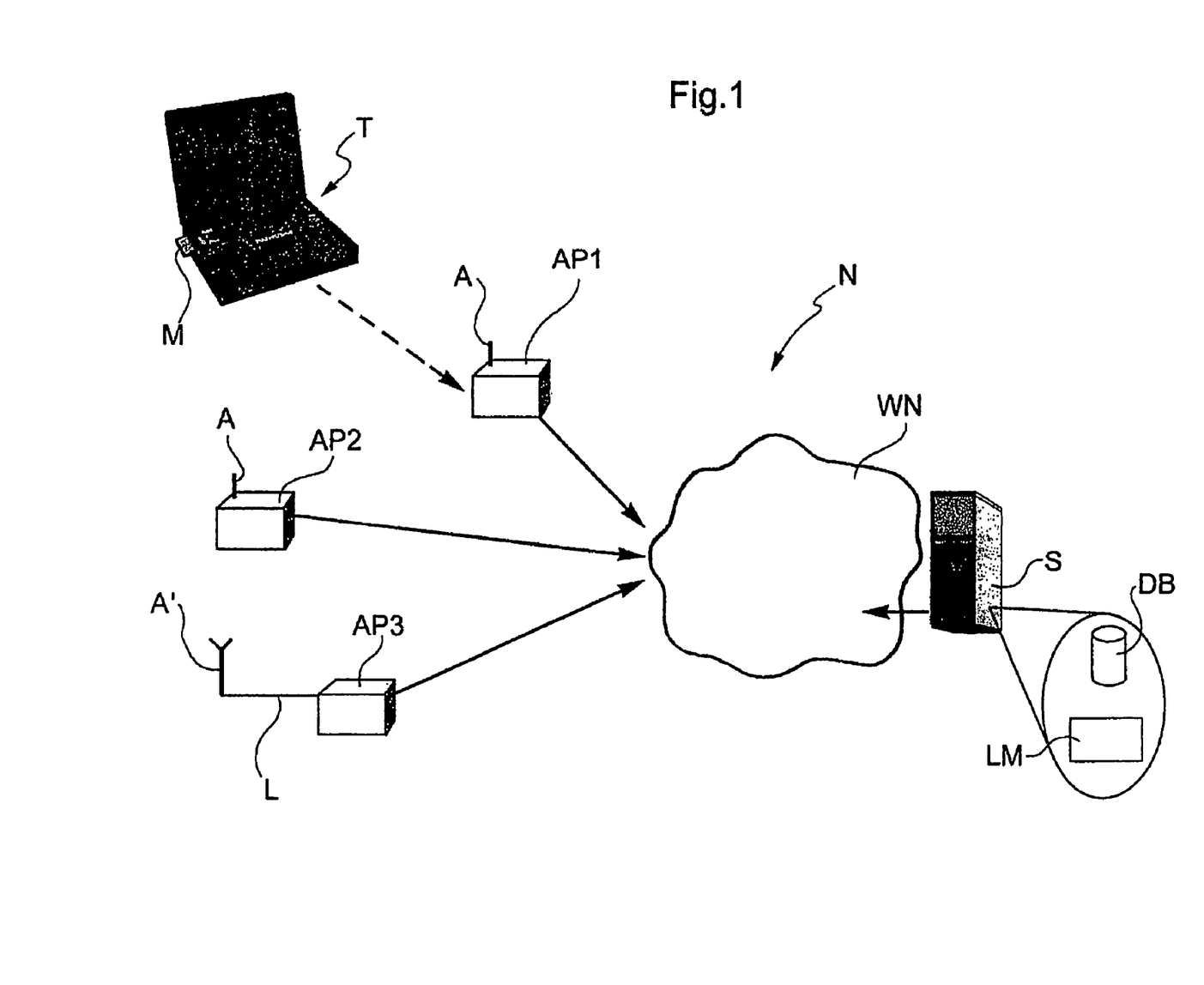
FIG. 1 is a schematic representation of a WLAN network.

FIG. 1 shows a typical example of WLAN network, marked with reference N. It comprises a plurality of Access Points, three of which are shown in the figure and designated by references AP1, AP2, AP3, each one equipped with an integrated antenna A or a remote antenna A'; in this latter case, antenna A' is connected to Access Point AP3 through cables or similar transmission lines L of a predetermined length.

In order to communicate with the Access Points, users use WLAN terminals T, such as, for example, PC or palmtops, equipped with a WLAN apparatus M, such as a PCMCIA card, a PCI adapter, etc. integrated or not in the terminal itself.

Communications (shown with a dashed line) occur through the radio medium with a standard protocol, such as, for example, one of IEEE 802.11 protocols, or a proprietary one.

Access Points APn are connected (solid line) to a wired network WN through which users access to all services available. A locating server S is present in the network and, activated by the user himself through required services or the network, locates the terminal T.

Server S comprises or is coupled with a data base DB in which information entered during system configuration step are stored, and a locating engine or module LM including different algorithms as program codes that can be executed on the server to perform the terminal position computation.

As said, the system needs an initial configuration step and information that can be provided in this step are: Access Points location, radio-electric network characteristics, environmental characteristics and signatures.

These information, wholly or in part, are entered by system users inside the data base DB. Various possible combinations are:

- AP positions;
- AP positions+network characteristics;
- AP positions+network characteristics+environmental characteristics;
- signatures;
- AP positions+signatures;
- AP positions+network characteristics+signatures;
- AP positions+network characteristics+environmental characteristics+signatures.

The system is able to operate with any one of the listed combinations.

Solutions are listed in order of amount of required time and investments for the configuration step: the first solution is the least heavy, the last one is the heaviest. Obviously, the heavier solutions allow obtaining greater locating accuracies.

Every time a WLAN terminal must be located, the system requires it or the network about some information, that can be: serving Access Point identification, received Access Points identifications, one or more radio-electric or performance parameters on the signal received by the WLAN terminal and transmitted from the serving Access Point, one or more radio-electric or performance parameters on signals received from WLAN terminal and transmitted from received Access Points.

Not always will the terminal be able to provide all required information, but it will give the system any subsystem of them. In particular, possible combinations are:

- server AP;
- server AP+received AP;
- server AP+measure of one or more parameters of server AP;
- server AP+measure of one or more parameters of server AP+received AP+measure of one or more parameters of received AP.

The system is able to operate with any one of the listed combinations.

More complex terminals are able to provide the last combination, while simpler terminals will be limited to the first items of the list. Information that a terminal is able to provide depend on the type of terminal, the type of used WLAN apparatus, and the operating system.

The locating accuracy will depend on the type of combination provided to the system.

Figure 2:
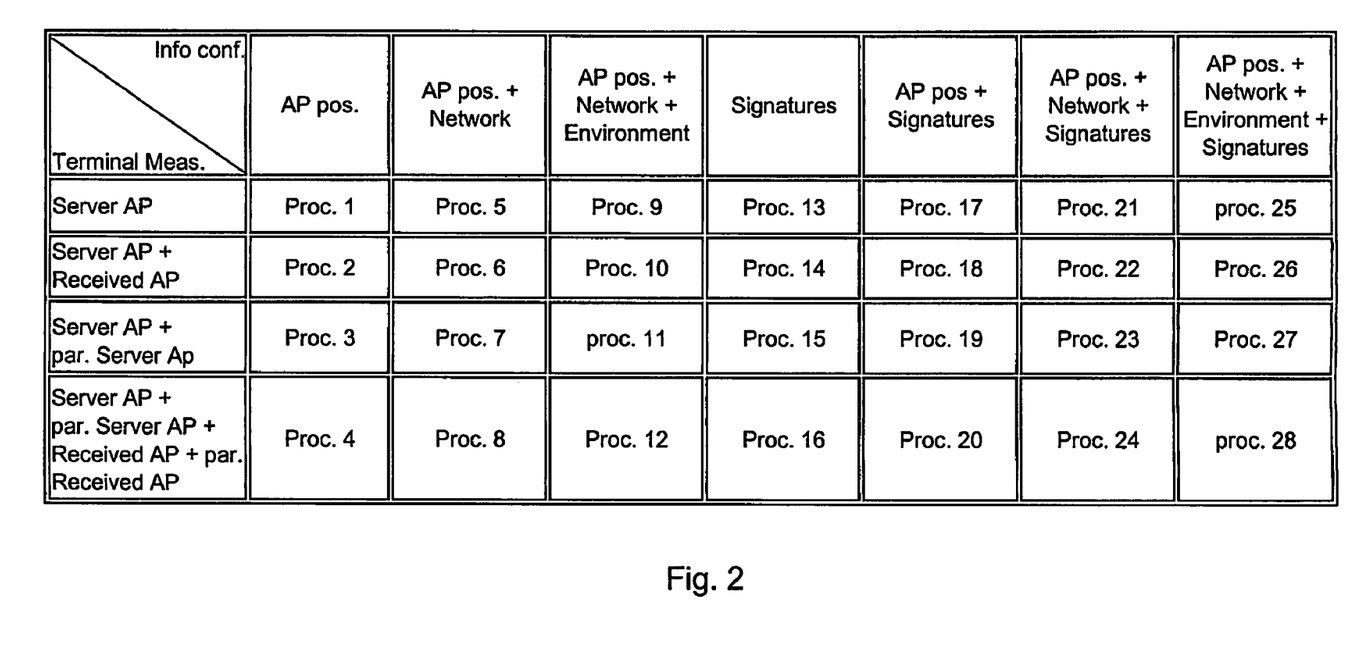
FIG. 2 shows a table of procedures for locating a WLAN terminal depending on necessary information for system configuration and information provided from terminals to system during location.

The locating engine or module LM organises information that it has available in a matrix form, as shown in the table in FIG. 2, in which the first line includes the necessary information for configuring the system, while the first column includes information provided to system by terminals.

Every matrix box corresponds to a determined procedure for locating a network terminal.

Each procedure listed in the table corresponds to a foreseen locating accuracy and a weight index in terms of difficulty in providing information during configuration. The weight index is computed through a weight function. Such function estimates the weight (or cost) of each configuration depending on one or more of the following characteristics: difficulty in finding information, necessary time for collecting information, level of detail of necessary information and need for updating and maintaining information themselves.

The system, depending on user-required accuracy and depending on the WLAN terminal available to the user will advise about the type of less burdensome configuration that allows obtaining the required accuracy.

In any case, if only a subset of configuration information should be available, the system will adapt itself thereto and will provide the maximum possible degree of accuracy.

Each locating procedure, in addition to providing the estimated position, also returns an accuracy value of such location. This value depends on the selected procedure, but also on network characteristics and type of available information (for example, on signatures density, if used).

Once having ended the initial system configuration step (advised by the system itself or predetermined), the locating procedure choice can occur in various ways:

1) Taking into account data provided when configuring and the type of measures provided by terminal or network, the system chooses the procedure that on average provides a greater accuracy, independently from the specific measure. In the table this means choosing a procedure belonging to the column on the side that is most right as possible (according to available information after the configuring step) and the downmost line (depending on data provided by the terminal).
2) Selecting the procedure that corresponds to a better computed accuracy. This selection is automatically performed by the system. Having a specific measure and configuration data available, possible procedures to be applied are known. A computed accuracy corresponds to each one of them, so that the system can choose the procedure with best accuracy.
3) Selecting a procedure depending on accuracy and response speed of the service required by the user.
   In fact, the services used by the user can be each characterised by a minimum accuracy about user position, by a maximum response speed to service requests or both at the same time. For example, if the user requires a service for which it is important that the locating system determines its position in the shortest possible time, independently from accuracy, the selected locating procedure will be such as to satisfy this request. If instead the user requires a service for which it is important to have an accuracy on the highest possible position, independently from the response times, the selected locating procedure will be such as to also satisfy this request. The procedure selected by the system will then be the one that allows satisfying both requirements posed by services required by users.
4) Selecting a procedure depending on tariffs applied to users.
   In fact, each service used by a user can be priced differently depending on the accuracy with which, for service purposes, the locating system user position is determined. When a user decides to use these services, he can specify, in front of different pricing hypotheses, each corresponding to a given accuracy, the one he deems most adequate. The locating system will take into account this choice upon selecting the procedure with which a user is located.
5) It can be possible, for the locating system user, to choose a predetermined procedure. For example, having collected the signatures, it can happen that a modification of environmental characteristics (for example addition of a moving wall) can make a procedure requiring signatures unusable. In such case, for a transient period, the manager can decide to use other procedures, for example those based on the a priori knowledge of the Access Point position.

Upon entering a WLAN terminal in the network or immediately after the first location, it is further possible for the system to transfer on the WLAN terminal the algorithm contained in the locating engine. In this way it is the WLAN terminal itself that determines its own position and transfers it to the system upon every service request.

The advantages of this solution are:
saving of network transmission capacity, since the terminal must not transmit measures to centralised server;
higher accuracy in estimating the position with the same system response speed, since the necessary measures for determining the position can be performed by the WLAN continuously and not only upon every service request;
possible simultaneous management by the server of a higher number of terminals since part of the processing load is performed by the terminals themselves or at least by those to which the system transfers the locating engine.

Moreover, the system, in order to save further transmission capacity and in order to be able to efficiently operate also with terminals equipped with less memory and processing capability, can transfer to the WLAN terminal only some or even a single locating procedure, chosen depending on measures that the terminal itself is able to perform and/or depending on the required service accuracy and/or depending on tariffs applied to a user.

With reference to such situation, in the initial step, it is necessary to transfer to the terminal the portion of data base DB used by the transferred procedures. Alternatively, it is possible to transfer only a suitable synthesis of the data base portion. For example, in case of signatures, it is possible to transfer a statistical model of them.

Conveniently, the system can include a second data base in which the behaviour in time of the position of every user is recorded. By suitably extrapolating these information, it is possible to provide, with high accuracy, future positions of a WLAN terminal. These information are used both by the different procedures to reduce errors on position computation or to remove possible ambiguities, and to reduce the number of measures performed by the terminal and therefore to save network transmission capacity, and still more to provide the user with some services without any explicit request by the user himself.

The locating procedures provided by the method and system of the invention, with reference to the table in FIG. 2, are as follows.

Procedure 1

With geometric considerations only, it is possible to locate, starting from the position of all Access Points, the area covered by each one of them and therefore in particular the area covered by the one serving the terminal to be located. For example, point X is covered by the i-th Access Point if the distance from point X to such Access Point is less than the distance from the same point to all other Access Points.

Once having located the area in which the terminal can be found (or an estimation that the terminal is in there), an estimation of the barycenter position of such area is returned and, as uncertainty value, a meaningful dimension of such area, such as the maximum value or a suitable percentile value, for example percentile 67%, of the distances between such barycenter and all points of the area.

Procedure 2

By applying procedure 1 the area covered by the Access Point that serves the terminal to be located is pointed out. In addition, with topologic considerations, namely depending on the position of received Access Points with respect to the serving Access Point, it is possible to restrict the located area into a sub-area. The barycenter of such sub-area is returned as position estimation, and as uncertainty value a meaningful sub-area dimension, such as the maximum value or a suitable percentile value, for example percentile 67%, of the distances between such barycenter and all points of the sub-area.

For example, if received Access Point are those that can be found on the same side of the serving Access Point, the area is restricted including only that part whose points are nearer to the received Access Points than the unreceived ones.

Figure 3:
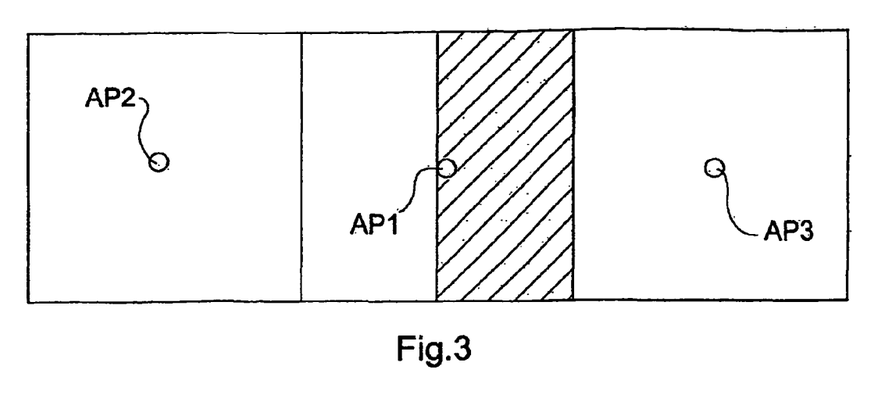
FIGS. 3 and 4 show a portion of local network (in which three Access Points are shown) and related location areas for a terminal according to procedures object of the invention.

FIG. 3 shows an example of a network composed of three Access Points, respectively AP1, AP2, AP3. In it, the rectangles schematically show the coverage areas of each Access Point, namely the area in which every Access Point is server. Such areas are located through procedure 1. It can be assumed that from the performed measure it is obtained that Access Point AP1 is, for a user, the serving Access Point, that Access Point AP2 is unreceived, and that Access Point AP3 is received. From these previous considerations, it can be assumed that the terminal can be found in the pointed-out sub-area.

Procedure 3

By applying procedure 1 the area covered by the Access Point that serves the terminal to be located is pointed out. In addition, from measured parameter or parameters (for example power of signals transmitted by serving Access Point, received by terminal) the located area is restricted into a sub-area. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

Figure 4:
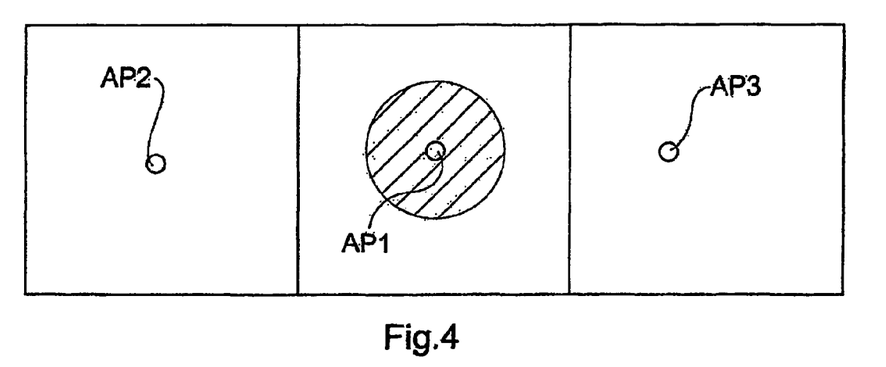

The area located through Procedure 1 can be restricted since, for example, the received power depends on the distance between transmitter and receiver. As shown for example in FIG. 4, if the terminal receives a high power, it means that it is near the Access Point (highlighted sub-area).

In general, for a given value of measured power, it is possible to delimit a circular crown or a related sub-area, of a more complex shape. Alternatively to the power, any other measured parameter can be used that is function of the distance, such as for example signal/noise ratio, Bit Error Rate (BER), etc.

Procedure 4

Procedure 3 is applied and, taking into account for example the received power also from other Access Points, the sub-area to which the terminal belongs is further restricted. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

Since the received power depends on the distance between transmitter and receiver, the sub-area within which the terminal to be located can be found is nearer to the Access Points from which a greater power is received. Also in this case, as an alternative to power, any other measured parameter can be used that is function of the distance, such as for example signal/noise ratio, Bit Error Rate (BER), etc.

Procedure 5

From the Access Points positions, and knowing network radio-electric characteristics (transmission powers, antenna radiation diagrams, aiming directions, etc.) it is possible to locate, with a higher accuracy with respect to procedure 1, the area covered by each Access Point, and then in particular the area covered by the one serving the terminal to be located. The barycenter of such area is returned as position estimation and as uncertainty value a meaningful dimension of the area is returned, such as the maximum value or a suitable percentile value, for example percentile 67%, of the distances between such barycenter and all points of the area.

For example, if the received power is used as reference parameter, point X is covered by the i-th Access Point if in point X the received power of signals transmitted by the i-th Access Point is greater than the received powers of signals transmitted by all other Access Points.

The computation of power received in point X from each Access Point is performed according to one of the propagations models known in literature for indoor environments.

Procedure 6

By applying procedure 5, the area covered by the Access Point that serves the terminal to be located is pointed out. In addition, with topologic considerations, namely depending on the position of received Access Points with respect to the serving Access Point, the located area is restricted into a sub-area. The barycenter of such sub-area is returned as position estimation, and as uncertainty value a meaningful sub-area dimension, such as the maximum value or a suitable percentile value, for example percentile 67%, of the distances between such barycenter and all points of the sub-area.

For example, again with reference to FIG. 3 and to similar considerations to those included as comment in procedure 2, if received Access Points are only those that can be found on the same side of the serving Access Point, the area is restricted including only that part whose points are nearer to received Access Points with respect to the unreceived ones.

Procedure 7

By applying procedure 5 the area covered by the Access Point that serves the terminal to be located is pointed out. In addition, from measured parameter or parameters (for example power of signals transmitted by serving Access Point, received by terminal) the located area is restricted into a sub-area. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

The area located through Procedure 5 can be restricted since, for example, the received power depends on the distance between transmitter and receiver. Again with reference to FIG. 4 and to similar considerations to those included as comment to procedure 3, for a given value of measured power, it is possible to delimit a circular crown or a related sub-area, of a more complex shape. If the terminal receives a high power, it means that it is near the Access Point (highlighted sub-area). Alternatively to the power, any other measured parameter can be used that is function of the distance, such as for example signal/noise ratio, Bit Error Rate (BER), etc.

Procedure 8

By applying procedure 5 the area covered by the Access Point that serves the terminal to be located is pointed out. In addition, from measured parameters (for example powers received by terminal of signals transmitted from serving Access Point and from received Access Points) the located area is restricted into a sub-area. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

With similar considerations to those included as comment to procedure 4, since the received power depends on the distance between transmitter and receiver, the sub-area inside which the terminal to be located can be found is nearer to the Access Points from which a greater power is received. Also in this case, alternatively to the power, any other measured parameter can be used that is function of the distance, such as for example signal/noise ratio, Bit Error Rate (BER), etc.
Procedure 9

Procedure 5 can be refined knowing the environmental characteristics, both in terms of arrangement of (perimetral and internal) walls, doors, windows, etc., and in terms of their electromagnetic characteristics, such as attenuation, reflection coefficients, etc.

These information allow obtaining, with better accuracy with respect to procedure 5, the area covered by each Access Point, and therefore also the area covered by the Access Point that serves the terminal to be located.

The computation of power received in every point is performed by using one of the propagation models known in literature for indoor environments, that take also into account attenuations and reflections produced by the environment and to which the signal is subjected.
Procedure 10

By applying procedure 9, the area covered by the Access Point that serves the terminal to be located is pointed out. In addition, with topologic considerations, namely depending on the position of received Access Points with respect to the serving Access Point, the located area is restricted into a sub-area. The barycenter of such sub-area is returned as position estimation, and as uncertainty value a meaningful sub-area dimension, such as the maximum value or a suitable percentile value, for example percentile 67%, of the distances between such barycenter and all points of the sub-area.

For example, again with reference to FIG. 3 and similar considerations to those included as comment of procedure 2, if received Access Points are only those that can be found on the same side of the serving Access Point, the area is restricted including only that part whose points are nearer to received Access Points with respect to the unreceived ones.
Procedure 11

By applying procedure 9 the area covered by the Access Point that serves the terminal to be located is pointed out. In addition, from measured parameter or parameters (for example power of signals transmitted by serving Access Point, received by terminal) the located area is restricted into a sub-area. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

The area located through Procedure 9 can be restricted since, for example, the received power depends on the distance between transmitter and receiver. Again with reference to FIG. 4 and to similar considerations to those included as comment of procedure 3, for a given value of measured power, it is possible to delimit a circular crown or a related sub-area, of a more complex shape. If the terminal receives a high power, this means that it can be found near the Access Point (highlighted sub-area). Alternatively to the power, any other measured parameter can be used that is function of the distance, such as for example signal/noise ratio, Bit Error Rate (BER), etc.
Procedure 12

By applying procedure 9 the area covered by the Access Point that serves the terminal to be located is pointed out. From measured parameters (for example powers received by terminal of signals transmitted from serving Access Point and from received Access Points) the located area is restricted into a sub-area. The barycenter of such sub-area is returned as position estimation and as uncertainty value a meaningful dimension of the sub-area is returned, such as the maximum value or a suitable percentile value, for example percentile 67%, of the distances between such barycenter and all points of the sub-area.

With similar considerations to those included as comment to procedure 4, since the received power depends on the distance between transmitter and receiver, the sub-area inside which the terminal to be located can be found is nearer to the Access Points from which a greater power is received. Also in this case, alternatively to the power, any other measured parameter can be used that is function of the distance, such as for example signal/noise ratio, Bit Error Rate (BER), etc.
Procedures 13-24

For these procedures, the method disclosed in WO-A-02-054813 can be employed.
Procedures 25-28

The method disclosed in WO-A-02-054813 can be further refined depending on environment physical and electromagnetic characteristics.

The statistic model disclosed in WO-A-02-054813 can be refined, in addition to the knowledge of the positions and electric characteristics of the Access Points, as already disclosed in WO-A-02-054813, also with the environmental knowledge. If, for example, the model refinement is performed by computing the received power in any point through any propagation model, the knowledge of environmental characteristics allows a higher computation accuracy, as already pointed out in Procedure 9.

Obviously, observing the invention principle, its embodiments and realisation parts can be widely changed with respect to what has been described and shown merely as a non-limiting example, without departing from the scope of the present invention, as defined by the enclosed Claims.

The invention claimed is:

1. A method for locating a terminal in a local wireless telecommunications network performed at a locating system that provides a location estimation of the terminal depending on a set of configuration data and on a set of measuring data, wherein the network comprises a plurality of access points providing services on a plurality of coverage areas and the locating system is located remotely from the terminal and the plurality of access points, comprising:

defining a set of configuration data comprising a plurality of configuration data base entries related to a configuration of the local wireless telecommunications network;

acquiring a set of measuring data from the terminal or the network comprising a plurality of measuring data types, wherein each measuring data type depends on the type of terminal and the set of measuring data indicates whether the terminal belongs to a subset of said plurality of coverage areas;

associating each of a plurality of locating procedures with a different combination of at least one of the plurality of configuration data base entries and at least one of the plurality of measuring data types, wherein each of the plurality of locating procedures is configured to estimate a position of the terminal based on the associated combination and corresponds to an accuracy value of the estimated position, each of said plurality of locating procedures having associated a respective weight index in terms of difficulty in providing said configuration data; and selectively actuating at least one of the plurality of locating procedures obtained from said associating step to provide the location estimation by taking into account said weight index and said accuracy value.

2. The method according to claim 1, wherein said selectively actuating comprises selecting one of the plurality of locating procedures depending on a set of available measuring data and on a prefixed accuracy threshold value of the location estimation, in such a way that said one of the plurality of locating procedures has an accuracy value that is not less than the prefixed threshold value and minimizes a weight function used for computing said weight index.

3. The method according to claim 1, wherein said selectively actuating comprises selecting one of the plurality of locating procedures depending on a set of available measuring data and on a prefixed set of available configuration data, in such a way that said one of the plurality of locating procedures has the best possible accuracy value of the location estimation.

4. The method according to claim 1, wherein said selectively actuating comprises selecting one of the plurality of locating procedures depending on a set of available measuring data and on a prefixed set of available configuration data, in such a way that said one of the plurality of locating procedures has the best response speed to the location estimation request.

5. The method according to claim 1, wherein said selectively actuating comprises a step of selecting one of the plurality of locating procedures depending on a set of available measuring data and on a prefixed set of available configuration data, in such a way that said one of the plurality of locating procedures has a pricing value in compliance with a value predefined by a user.

6. The method according to claim 1, wherein said set of configuration data comprises at least one configuration data base entry among the plurality of configuration data base entries related to:
  locating coordinates of the access points;
  radio-electric characteristics of the network;
  structural and/or electromagnetic characteristics of the environment in which the network is deployed; and
  radio-electric or performance parameters of signals transmitted from the access points, in predetermined space positions belonging to the coverage area of the network.

7. The method according to claim 1, wherein said set of measuring data acquired by the terminal or the network comprises at least one measuring data type among the plurality of measuring data types related to:
  identification of the access point by which the terminal is served;
  identification of the access points received by the terminal;
  at least one radio-electric or performance parameter of signals transmitted from the access points by which the terminal is served; and
  at least one radio-electric or performance parameter of signals transmitted by the access points received by the terminal.

8. The method according to claim 1, further comprising transferring, to the terminal of the network, processing programs for performing at least one subset of said plurality of locating procedures and at least one subset of said plurality of configuration data base entries used by the transferred locating procedures, whereby the location estimation is performed by the terminal and information about estimated position and estimation accuracy are transmitted from the terminal to the locating system upon every service request.

9. The method according to claim 8, wherein the selection of the at least one subset of said plurality of locating procedures that can be performed by the terminal occurs depending on measures that the terminal is able to perform and/or the required locating accuracy and/or the applied pricing when using the terminal.

10. The method according to claim 1, further comprising creating and maintaining a data base for storing a time succession of estimated positions of the terminal.

11. The method according to claim 1, wherein at least one of the plurality of locating procedures associated with a combination of at least one of the plurality of configuration data base entries and at least one of the plurality of measuring data types estimates the position of the terminal corresponding to the barycenter coordinates of the coverage area of said access point and an uncertainty value, the uncertainty value being defined by the distances from said barycenter to all points of the coverage area, wherein the at least one of the plurality of configuration data base entries relates to locating coordinates of the access points, locating coordinates of the access points and radio electric characteristics of the network, or locating coordinates of the access points and radio electric characteristics of the network and the structural/electromagnetic characteristics in which the network is deployed, and the at least one of the plurality of measuring data types relates to the identification of the access point by which the terminal is being served.

12. The method according to claim 11, wherein the at least one of the plurality of locating procedures estimates the position of the terminal corresponding to the barycenter coordinates of a coverage sub-area of the access point by which the terminal is served comprising the points nearer to the access points received by the terminal with respect to unreceived bass stations access points and an uncertainty value, the uncertainty value being defined depending on the distances from said barycenter to all points of the sub-area, and the at least one of the plurality of measuring data types further relates to the identifications of the access points received by the terminal.

13. The method according to claim 11, wherein the at least one of the plurality of locating procedures estimates the position of the terminal corresponding to the barycenter coordinates of a coverage sub-area of said access point defined depending on the distance from said access point to the terminal estimated depending on said parameter and an uncertainty value, the uncertainty value being defined depending on the distances from said barycenter to all points of the sub-area, and the at least one of the plurality of measuring data types further relates to at least one radioelectric or performance parameter of the signal transmitted from said access point and depending on the distance from said access point to the terminal.

14. The method according to claim 12, wherein the at least one of the plurality of locating procedures estimates the position of the terminal corresponding to the barycenter coordinates of a coverage sub-area of the access point by which the terminal is served, defined depending on the distances from said access points to the terminal and estimated depending on said parameters and an uncertainty value, the uncertainty value being defined depending on the distances from said barycenter to all points of the sub-area, and the at least one of the plurality of measuring data types further relates to at least one radio-electric or performance parameter transmitted from said server access point and depending on the distance from said access point to the terminal and at least one radio-electric or performance parameter of the signal transmitted from received access points and depending on the distance from said access points to the terminal.

15. A processing system for locating a terminal in a local wireless telecommunications network by providing a location estimation of the terminal, wherein the network comprises a plurality of access points that provide services on a plurality of coverage areas and the processing system is located remotely from the terminal and the plurality of access points, comprising:

storage modules for storing a plurality of configuration data parameters related to a configuration of the local wireless telecommunications network and a plurality of measuring data types acquired from the terminal or the network and indicating whether the terminal belongs to a subset of said coverage areas, said plurality of measuring data types depending on the type of terminal; and a locating processing module that associates each of a plurality of locating procedures with a different combination of at least one of the plurality of configuration data parameters and at least one of the plurality of measuring data types, and that performs one of the plurality of locating procedures related to a selected combination to provide the location estimation, each of the plurality of locating procedures having associated a respective weight index in terms of difficulty in providing said configuration data parameters, wherein each of the plurality of locating procedures is configured to estimate a position of the terminal based on the associated combination and corresponds to an accuracy value of the estimated position, wherein each of the plurality of locating procedures takes into account said weight index and said accuracy values.

16. A local wireless telecommunications network, comprising a processing system for locating a network terminal according to claim 15.

17. A non-transitory computer-readable medium storing instructions for execution by a processing system, the instructions comprising one or more code modules that when executed by the processing system perform a method for locating a terminal in a local wireless telecommunications network according to claim 1.

* * * * *